United States Patent [19]
Omata

[11] Patent Number: 4,576,252
[45] Date of Patent: Mar. 18, 1986

[54] ROTATION DAMPER

[75] Inventor: Nobuaki Omata, Yokohama, Japan

[73] Assignee: Nifco Inc., Yokohama, Japan

[21] Appl. No.: 598,534

[22] Filed: Apr. 10, 1984

[30] Foreign Application Priority Data

Apr. 15, 1983 [JP] Japan ................. 58-55429[U]

[51] Int. Cl.[4] .............. F03G 1/00; F16D 57/00; E05F 3/14
[52] U.S. Cl. ............................. 185/39; 16/82; 16/DIG. 9; 49/379; 188/290; 188/322.5
[58] Field of Search ............ 185/37, 39; 49/379; 16/51, 62, 82, DIG. 9; 242/107.3, 107.7; 188/290, 322.5

[56] References Cited

U.S. PATENT DOCUMENTS

| | | | |
|---|---|---|---|
| 1,027,663 | 5/1912 | Miller | 242/107.7 |
| 1,861,221 | 5/1932 | Martin et al. | 242/107.7 |
| 2,507,182 | 5/1950 | Young, Jr. | 188/322.5 X |
| 2,553,593 | 5/1951 | Lermont | 188/290 X |
| 4,270,709 | 6/1981 | Inukai | 242/107.7 |
| 4,342,135 | 8/1982 | Matsuo et al. | 16/225 |
| 4,426,752 | 1/1984 | Nakayama | 188/290 X |
| 4,470,220 | 9/1984 | Sudo | 49/379 |

FOREIGN PATENT DOCUMENTS

| | | |
|---|---|---|
| 54-82614 | 6/1979 | Japan . |
| 56-103902 | 8/1981 | Japan . |
| 56-111403 | 8/1981 | Japan . |
| 56-50572 | 11/1981 | Japan . |

Primary Examiner—Allan D. Herrmann
Attorney, Agent, or Firm—Albert J. Brunett; Thomas W. Buckman

[57] ABSTRACT

A rotation damper comprises a base member, a gear wheel rotatably mounted on the base member via a damper, a spiral spring having one end attached to a cap member and the other end attached to the gear wheel and adapted to be wound up with the rotation of the gear wheel, and a locking member for locking the spiral spring in or releasing it from the wound-up state. When the gear wheel is rotated to the neighborhood of a limit position against the spring force of the spiral spring, the spiral spring is locked in the wound-up state. The spiral spring is released from the wound-up state by further rotating the gear wheel. The rotation damper is applicable to a cassette holder of a cassette tape recorder, for instance, and permits the holder to be opened and closed under braking force while eliminating the need for a separate holder locking mechanism.

4 Claims, 8 Drawing Figures

ROTATION DAMPER

BACKGROUND OF THE INVENTION

This invention relates to a rotation damper for damping the rotation of a rotating member such as cassette lid for tape recorder.

Various rotation dampers are used to provide braking force on, for instance, tape cassette holder lids for tape recorders, video cassettes, etc. for preventing the lids from being quickly opened. Such rotation dampers are disclosed, for example, in Japanese Utility Model Publication No. 56-50572 and Japanese Utility Model Application Disclosure Nos. 54-82614, 56-103902 and 56-111403. All of these rotation dampers utilize the frictional force between a rotating member rotated by an input rotational force and a body surrounding or facing the rotating member for damping the rotating force. Therefore, the dampers wear out and lose their braking action after long use. In order to solve the problems of the rotation dampers based on the frictional force, the applicant earlier proposed a rotation damper, in which a rotating member is rotated in or in contact with high viscosity oil such as silicone grease, and which thus provides a braking action based on the resistance offered by the viscosity of the oil, as disclosed in U.S. Pat. No. 4,342,135.

In these rotation dampers, the braking action is provided when a locking mechanism which locks, for instance, the cassette holder lid of a cassette tape recorder (the rotating member) in a closed position, is released by depressing an ejection button or the like. This means that a locking mechanism for holding the lid locked in the closed position must be incorporated, in addition to a damper between the lid and the apparatus body and a spring for biasing the lid in the opening direction, thus increasing the number of components, complexity of assembly and cost of the apparatus.

SUMMARY OF THE INVENTION

An object of the invention is to provide a rotation damper for use in various apparatuses having a rotating member such as a lid, which by a simple operation of merely urging the rotating member permits the rotating member to be opened and closed in a braked manner without need for a locking mechanism for holding the rotating member locked in the closed position, which ensures that the rotating member is reliably held closed and which permits simplification of the construction of the apparatus body.

According to the invention, the above object is attained by a rotation damper, which comprises a base member, a gear wheel rotatably mounted on the base member via a damper, a cap member accommodating the gear wheel and secured to the base member, a spiral spring provided with one end attached to the cap member and the other end attached to the gear wheel and wound up with the rotation of the gear wheel in one direction, and a locking member functioning to lock the spiral spring in a wound-up state after the gear wheel has been rotated against the force of the spiral spring up to a position in the neighborhood of a limit position and releasing the spiral spring from the wound-up state with a subsequent slight rotation of the gear wheel.

The base member is secured to either the apparatus body or the lid, and the relative movement of the other is transmitted to the base member by means of a gear or pinion. When closing the rotating member, e.g., a tape cassette lid, by pushing it with the hand, the spiral spring is wound up from one end, whereby progressively increasing braking force is applied to prevent the lid from being closed with a thud. When the spring is substantially wound up, it is locked against release by the locking member, whereby the lid is held locked in the closed position. When opening the lid, the locking member is released to release the spiral spring. The spiral spring is unwound while being braked, so that the lid can be opened quietly. Thus, according to the invention the rotating member is braked while it is opened and closed by the provision between the rotating member and the body of the apparatus of only a damper and a gear or sector gear meshed with a damper gear. In addition, the rotation damper is free from wear even through long use.

The above and other objects and features of the invention will become more apparent from the following description when the same is read with reference to the accompanying drawings.

DESCRIPTION OF THE PREFERRED EMBODIMENTS

The embodiments of the rotation damper according to the invention to be described hereinafter with reference to the accompanying drawings are applied to the cassette holder of a cassette tape recorder, but it is to be understood that this application is by no means limitative.

Referring now to FIGS. 1 through 5, there is shown a first embodiment of the rotation damper according to the invention. The rotation damper shown comprises a base member 1, which has securement means 1' mounted on the associated apparatus by means of pawls or bolts. An arcuate wall 2 projects upright from the base member 1. The arcuate wall 2 has a circumferential length slightly greater than one half the circumference of the base member 1. The space defined by the arcuate wall 2 is occupied by a gear wheel 3 having a peripheral gear. The peripheral gear portion of the gear wheel 3 projects from the opposite ends of the arcuate wall 2 and meshes with a gear which is moved when a rotating member such as a lid is opened and closed. The height of the arcuate wall 2 is slightly greater than the thickness of the gear wheel. The gear wheel 3 has a lower end flange 3' which is slightly greater in diameter than the addendum circle of the peripheral gear portion. The arcuate wall 2 has an inner shoulder 2a which clip fits on the flange 3' from above. By pushing the gear wheel 3 into the arcuate wall 2 from above, the shoulder 2a is snappedly engaged with the flange 3' so that the gear wheel is retained in position.

Figure 1:
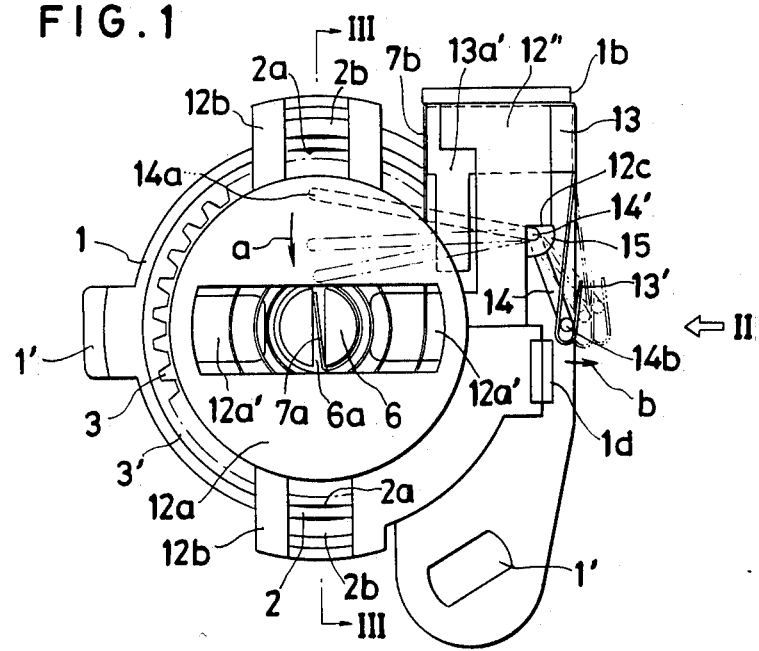
FIG. 1 is a plan view showing an embodiment of the rotation damper according to the invention.
Figure 2:
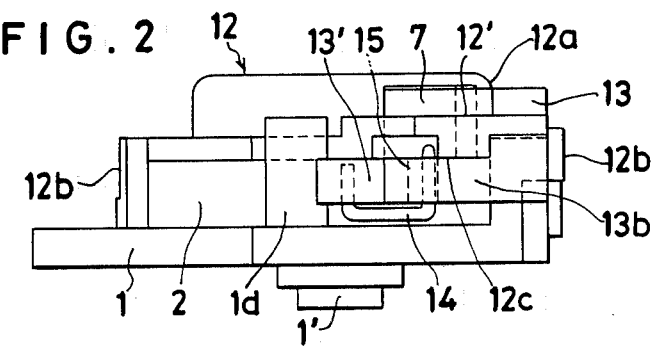
FIG. 2 is a side view of the same embodiment.
Figure 3:
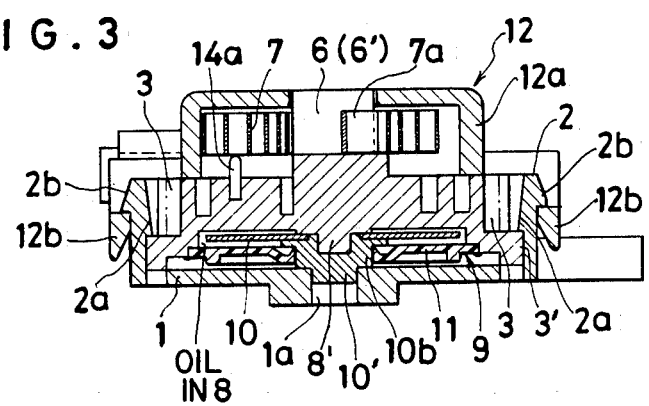
FIG. 3 is a sectional view taken along line III—III in FIG. 1.
Figure 4:
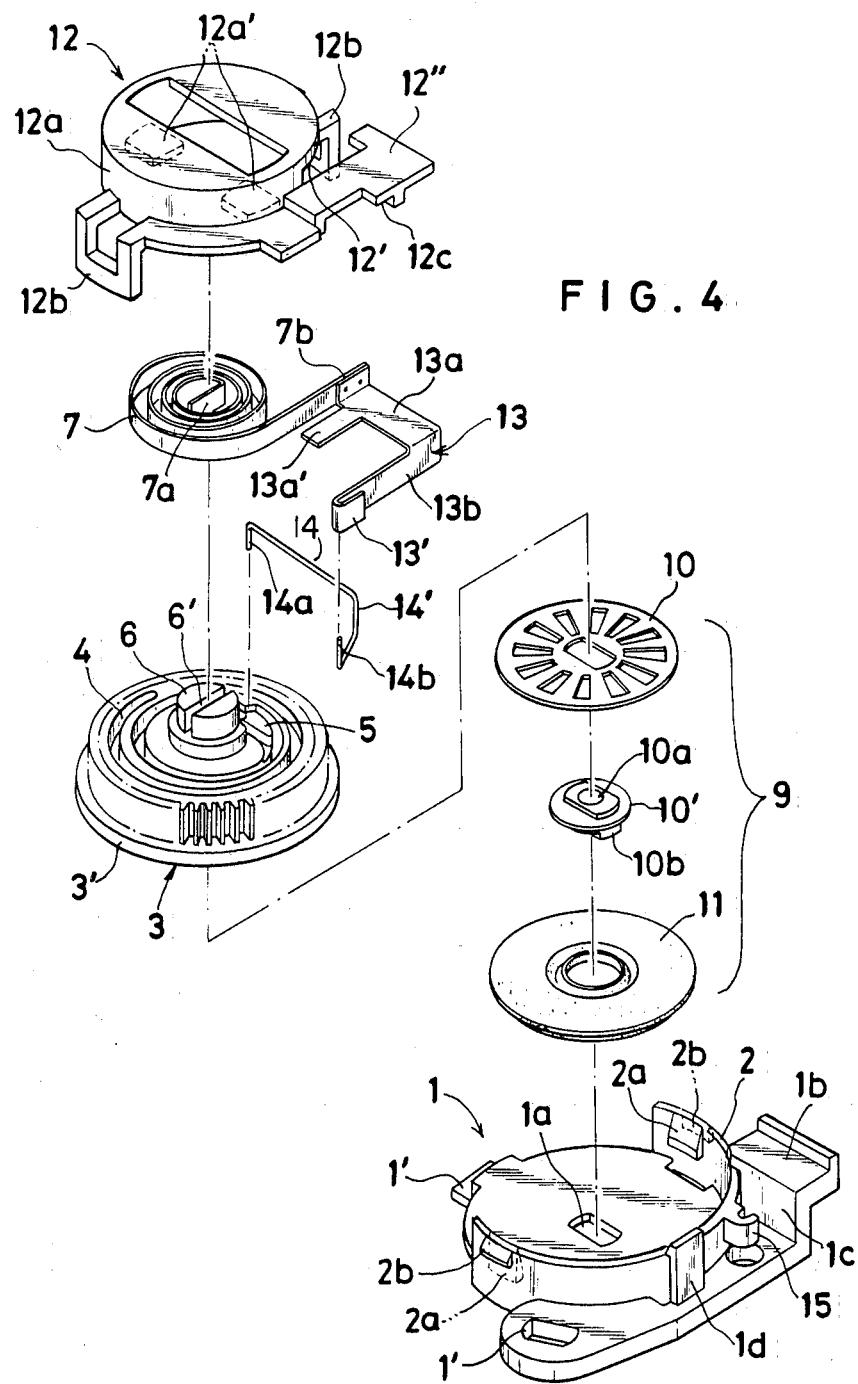
FIG. 4 is an exploded perspective view of the same embodiment.

The gear wheel 3 has a spiral groove 4 formed in its top surface. The inner end of the spiral groove 4 surrounds a heart-shaped island projection 5 which is located at the substantial center of the gear wheel top. The gear wheel 3 has a shaft 6 projecting from its top center. The shaft 6 has a diametrical groove 6' in which the inner end 7a of a spiral spring 7 is received. The gear wheel 3 has a concentric circular recess 8 formed in the bottom and a projection 8' projecting from the center of the recess bottom (FIG. 3). The recess 8 accommodates a damper 9 which brakes the rotation of the gear wheel in both the forward and reverse directions with oil. The damper 9 includes a damper disc 10 with oil coated on both the top and bottom surfaces. The damper disc 10 is rotatably fitted on the upper end of a damper shaft 10'. The damper shaft 10' has a recess 10a formed at its top, in which the projection 8' of the gear wheel 3 is rotatably fitted. The top surface of the damper disc 10 and the bottom of the recess 8 face each other with oil therebetween. A seal disc 11 with oil coated on its top surface is rotatably fitted on the damper shaft 10' below the damper disc 10. The edge of the seal disc 11 is welded to the bottom of the gear wheel 3 surrounding the recess 8. The damper shaft 10' has a lower non-circular portion 10b, which is fitted in a complementary hole 1a formed in the central portion of the base member 1 surrounded by the arcuate wall 2. With this construction, the damper shaft 10' and damper disc 10 do not rotate in either direction when the gear wheel 3 is rotated in the forward or reverse direction, and the bottom of the recess of the gear wheel 3 and seal disc 11 welded to the gear wheel 3 are rotated in contact with the respective top and bottom surfaces of the damper disc 10 via oil. The rotation of the gear wheel 3 is thus effectively braked. The damper disc 10 and damper shaft 10', which are fabricated separately in this embodiment, may instead be formed as a one-piece member.

The gear wheel 3 is covered by a cap member 12 which is secured to the base member 1. The cap member 12 has a cylindrical inner space 12a having a diameter slightly smaller than the addendum circle of the gear wheel 3. The spiral spring 7 is accommodated in the space 12a. Leg members 12b project from diametrically opposite sides of the periphery of the cap member 12 and rest on the top of the ends of the arcuate wall 2. They have vertical portions which depend from their outer ends along the outer surface of the arcuate wall and have shouldered lower ends 12b which are hooked by a shoulder 2b projecting from the outer surface of the arcuate wall 2. At the bottom of the space 12a of the cap member 12, are provided two diametrically opposed support pieces 12a', and the spring 7 is supported on the support pieces 12a'.

The base member 1, gear wheel 3 and cap member 12 are preferably made of plastic material. The spiral spring 7 is accommodated in the space 12a of the cap member 12 in a substantially wound-up state. The outer end 7b of the spring 7 outwardly projects from the space 12a through a notch 12' in the peripheral wall of the cap member 12.

A metal spring member 13 is secured to the outer end of the spiral spring. It has a stem portion 13a perpendicularly extending from the outer end of the spiral spring 7, which stem portion is clamped between a retainer portion 1b outwardly projecting from the arcuate wall 2 of the base member 1 and a retainer portion 12" projecting from the cap member 12 when the cap member is secured to the base member 1. Reference numeral 14 designates a resilient metal lever which serves as a locking member to lock the spiral spring 7 in wound-up state. The lever 14 has a downward end 14a which extends into the spiral groove 4 formed in the top portion of the gear portion, a vertical stem portion 14' and an upward end 14b which is set in a folded end 13' of an extension 13b of the spring member 13.

The arcuate wall 2 of the base member 1 has a hook 15 projecting from the outer surface and facing a leg portion 1c depending from the retainer portion 1b. A lower portion of the vertical stem portion 14' of the lever 14 is hooked in the hook 15, and the upper portion thereof extends through a notch 12c formed in the retainer portion 12" of the cap member 12. The upward end 14b of the lever 14 is hooked in the folded end 13' of the extension 13b of the spring member 13. The stem portion 13a of the spring member has a tongue-like extension 13a' which retains the lever 14 from above to prevent detachment thereof.

To assemble the rotation damper, the damper 9 is assembled in the recess 8 in the gear wheel 3, which is then set on the base member 1 by fitting the non-circular lower portion 10b of the damper shaft 10 in the hole 1a formed in the base member 1. The vertical stem portion 14' of the lever 14 is then set in the hook 15 of the base member 1 and notch 12c of the cap member, and its downward end 14a is inserted into the spiral groove 4 at the outer end thereof. The cap member 12 with the spiral spring 7 accommodated therein is then placed on the top of the arcuate wall 2 of the base member 1, and the spring member 13 projecting from the outer end of the spiral spring 7 projecting through the notch 12' is placed on the retainer portion 1b of the base member 1. In this state, the cap member 12 is downwardly urged while inserting the inner end 7a of the spiral spring in the diametrical groove 6' of the shaft 6 of the gear wheel 3, whereby the leg members 12b of the cap member 12 falling along the outer surface of the arcuate wall 2 are snappedly locked by the shoulder 2b thereof. The cap member 12 is thus secured to the arcuate wall 2 such that it strides the arcuate wall, and a very slight gap is formed between the cap member 12 and the top of the gear wheel 3. The upward end 14b of the lever 14 is then hooked in the folded end 13' of the extension 13b of the spring member 13 using a suitable tool.

The base member 1 may be provided with a pawl member 1d aside from the shoulder 2b on the outer surface of the arcuate wall for snappedly locking the cap member 12.

The rotation damper which has been assembled in the manner as described, may be used with the base member secured to the lid and the peripheral gear portion of the gear wheel 3 meshed with a gear provided in the body of the apparatus. Conversely, the base member may be secured to the body of the apparatus and the peripheral gear portion of the gear wheel 3 may be meshed with a gear or peripheral gear portion on the lid. In either case, when the lid is closed by pushing it with the hand, the spiral spring 7 is adapted to be wound up from its inner end retained by the shaft 6 of the gear wheel 3 with the rotation of the shaft 6.

As the spiral spring 7 is wound up with the lid urged by the hand in the closing direction, the downward end 14a of the lever 14 is moved along the spiral groove 4 toward the inner end thereof. The lever 14 thus swings about its vertical stem portion 14', as indicated by the arrow a in FIG. 1, causing deformation of the extension 13b of the spring member 13 in the manner as shown by the arrow b in FIG. 1. At this time, the bottom of the recess 8 of the gear wheel 3, which faces the damper disc 10 and is secured to the damper shaft 10' which is received against rotation in the non-circular hole 1a of the base member and the seal disc 11 secured to the gear wheel, are rotated relative to the damper disc 10 in contact with oil. The rotation of the gear wheel 3 is thus braked at all times. In addition, as the spiral spring 7 is wound up, the braking force offered against the rotation is progressively increased. Thus, the lid can be prevented from being closed sharply.

Figure 5:
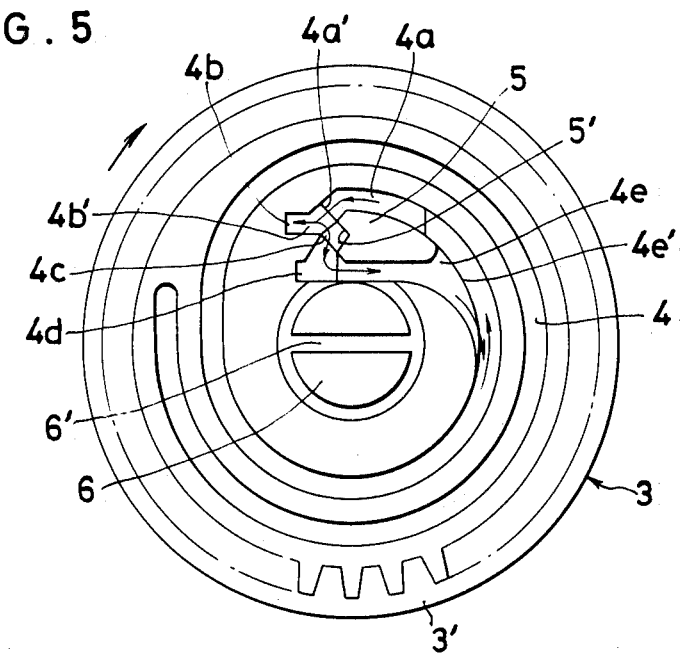
FIG. 5 is a developed enlarged-scale plan view showing a gear member.

When the lid comes to a position immediately before its closed position, the end 14a of the lever 14 reaches the neighborhood of the heart-shaped island projection 5. As shown in FIG. 5, the heart-shaped island projection 5 is surrounded by an extension 4a of the spiral groove 4 which extends along one side of the island projection and becomes progressively shallower toward the end, a slightly deeper groove 4b of a small length, which extends from the shallowest end 4a' of the groove 4a in a bent fashion, a groove 4c which extends from entrance 4b' of the groove 4b and is defined by a notch 5' formed in the island projection 5 and slightly deeper than the groove 4c, a groove 4d which extends from the groove 4c toward the other end of the island projection and is deeper than the groove 4c, and a return route groove 4e which extends from the groove 4d along the other end of the island projection, becomes progressively shallower and joins the spiral groove 4 at its shallowest end 4e'.

The downward end 14a of the lever 14 that has reached the inner end of the spiral groove 4, thus cannot enter the return route groove 4e which communicates with the spiral groove at the shallowest end 4e'. With continuing rotation of the gear wheel 3, it proceeds along the groove 4a constituting as an extension of the spiral groove 4, and when it enters the groove 4b, it comes to a halt. This position of the end 14a is set to correspond to a slightly overshoot portion of the lid from the closed position thereof. The operator closing the lid senses the striking of the end 14a of the lever 14 with the end wall of the groove 4b, so that he removes his hand from the lid. As a result, the spiral spring is released and delivers its stored spring force, causing the downward end 14a of the lever 14 to proceed backwards along the groove 4b. The groove 4b extends in a bent fashion from the shallowest end 4a' of the groove 4a and is deeper than the shallowest end 4a' of the groove 4a as noted earlier. Therefore, the downward end 14a of the lever 14 proceeding backwards can no longer enter the groove 4a, so that it proceeds to the groove 4c, which extends from the entrance 4b' of the groove 4b. Consequently, the spring force of the spring is received by the notch 5' formed in the island projection 5, so that the spring is not unwound.

It is to be understood that when the lid is released after it has been pushed until it is brought beyond its closed position and can no longer be moved in the closing direction due to the striking of the downward end 14a of the lever with the groove end wall, the spring is slightly unwound to an extent that the cassette lid is brought pack to and retained in the closed position.

To open the cassette lid, the user slightly depresses it from the closed position. As a result, the downward end 14a of the lever 14, which is at this time found in the groove 4c which is deeper than the groove 4b so that it cannot return to the groove 4b, is brought to the groove 4d which is deeper than the groove 4c. By subsequently releasing the lid, the downward end 14a is moved by the restoring force of the spring 7 in the backward direction from the groove 4d through the return route groove 4e to the spiral groove 4 and proceeds therealong up to the outer end thereof. During this time, the gear wheel 3 is reversely rotated to open the lid. The rotation of the gear wheel in the direction of opening the lid is of course braked by oil, so that the lid is opened quietly.

As has been shown, in the embodiment described above, by releasing the cassette lid after it has been pushed in the closing direction up to a position slightly beyond the closed position, the spiral spring 7 is slightly unwound until the downward end 14a of the lever 14 which serves as a locking member is locked in the groove 4c which serves as a locking groove at the inner end of the spiral groove 4. When the lid is slightly pushed from the closed position, the locking member 14 is detached from the locking groove 4c and brought back to the spiral groove 4 via the return route groove 4e, so that the lid is opened by the restoring force of the spring 7 while it is under a braking force.

The above embodiment is by no means limitative and can be modified in various ways. For example, the locking member which locks the spring when the cassette lid is closed may be released for opening the lid by directly operating it with the finger or through a link mechanism or like operating means.

Figure 7:
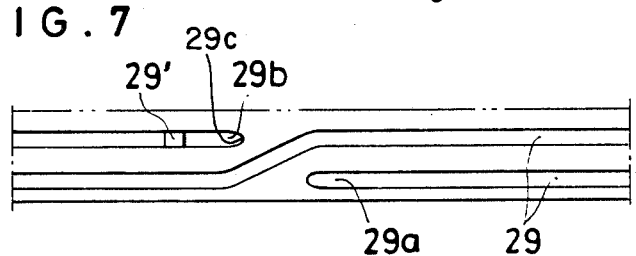
FIG. 7 is a developed enlarged-scale side view showing a lower peripheral portion of a gear member.
Figure 8:
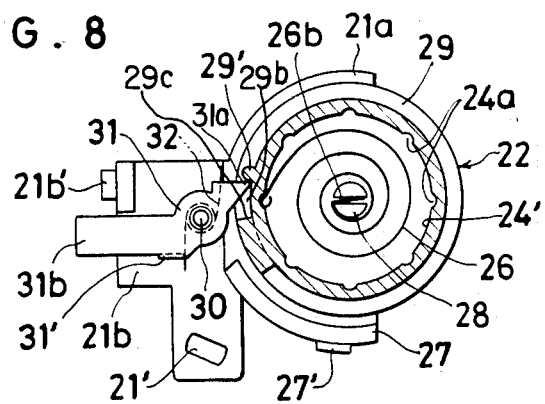
FIG. 8 is a plan view of another embodiment with a cap member removed showing the pawl member in its locked position.
Figure 6:
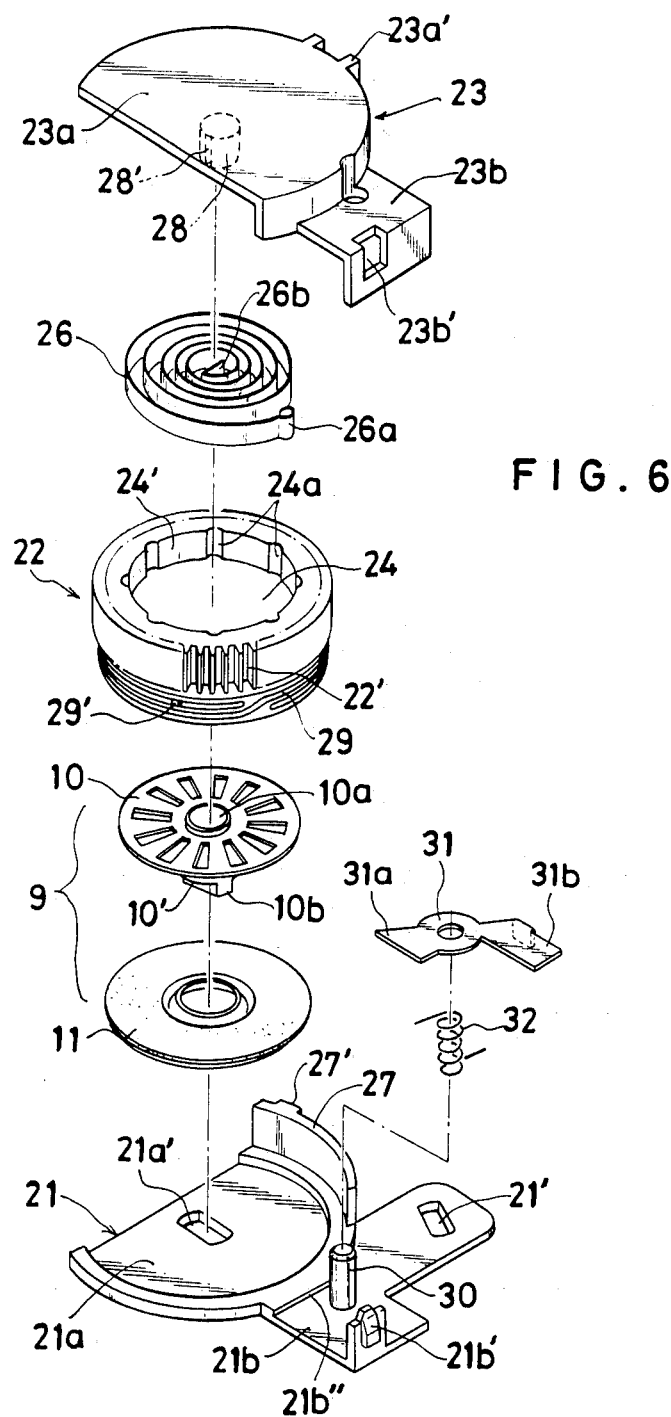
FIG. 6 is an exploded perspective view showing a different embodiment of the invention.

FIGS. 6 through 8 show another embodiment. Referring to these Figures, reference numeral 21 designates a base member with securing means 21', 22 a gear wheel, and 23 a cap member secured by snap engagement to the base member 21 with the gear wheel 22 rotatably disposed between it and base member 21. The base member 21, gear wheel 22 and cap member 23 are made of plastic.

The base member 21 has a semi-circular base portion 21a which supports the gear wheel 22 placed thereon and a retainer portion 21b projecting from the outer periphery of the base portion. The base portion 21a, like the base member 1 in the preceding embodiment, has a non-circular hole 21a', in which a complementary non-circular lower portion 10b of a damper shaft 10' of a damper 9 is fitted. The gear wheel 22 has a peripheral gear portion 22' and a partition wall 24 between a top recess 24' and a bottom recess (not shown). It has a projection, which projects downwards from the center of the bottom side recess and is rotatably received in a recess 10a formed in the top surface of the damper shaft 10'. Again in this embodiment, a damper disc 10 with oil coated thereon is rotatably fitted on the top of the damper shaft 10', and a seal disc 11 with oil coated on the top surface thereof is rotatably fitted on the damper shaft below the damper disc. The edge of the seal disc 11 is secured by means of welding to the bottom of the gear wheel 22 surrounding the bottom recess. In assembly, the non-circular lower portion 10b of the damper shaft 10' is fitted in the non-circular hole 21a' of the base member 21. The gear wheel 22 is thus braked by oil when it is rotated in either direction.

A spiral spring 26 is received in the top recess 24' of the gear wheel. It has a ridge portion 26a formed at its outer end. The ridge portion 26a is received in one of a plurality of circumferentially spaced-apart grooves 24a formed in the inner peripheral wall 24 defining the top recess 24'. The groove 24a to retain the ridge portion 26a may preferably be selected so as to provide a desired spring force of the spring. The depth of the top recess 24' is slightly greater than the height of the spring 26.

The base member 21 has an arcuate wall 27 projecting upright as a quarter circle along one half of the circumference of the base portion 21a. The wall 27 extends along the outer periphery of the gear wheel 22, and its top receives the cap member 23. The cap member 23 has a cap portion 23a which is supported on the top of the arcuate wall 27 and covers the top of the gear wheel 22 and a retainer portion 23b which covers the retainer portion 21b of the base member. The cap portion 23a has a shaft 28 projecting from the center of its bottom surface. The shaft 28 has an axial groove 28' for retaining the inner end 26b of the spring 26. The cap portion 23a has an outer projection 23a', and the retainer portion 23b has an edge projection 23b'. The projections 23a' and 23b' are adapted to be snap engaged by a projection 27' projecting from the outer surface of the arcuate wall 27 and a projection 21b' projecting from the edge of the retainer portion 21b, respectively. Thus, by pushing the cap member with the projections 23a' and 23b' aligned to the projections 27' and 21b', the cap member 23 is secured to the base member 21 with the gear wheel 22 disposed between the two. The outer periphery of the lower portion of the gear wheel 22 is formed with a helical groove 29 which consists of substantially two turns in this embodiment. FIG. 7 is a developed view showing the helical groove 29. A pin 30 projects from the retainer portion 21b of the base member. A pawl member 31 serving as a locking member is rotatably fitted on the pin 30. It is biased by a spring 32 fitted on the pin 30 and has one end 31a extending into the groove 29 and another end 31b projecting from the retainer portion 21b. The end 31a of the pawl member 31 is adapted to be positioned at one end 29a of the groove 29 when the lid is open. A protuberance 29' is provided in the groove 29 at a position slightly spaced apart from the other end 29b of the groove 29. As is obvious from FIG. 8, the end of the protuberance 29' is located within the groove 29.

Again in this embodiment, urging the lid in the closing direction causes clockwise rotation of the gear wheel 22 in one direction. The spiral spring 26 is thus wound up from the outer end in this embodiment. The rotation of the gear wheel 22 is braked by the damper 9. In addition, as the spring is wound up as the lid is urged in the closing direction, the braking force offered against the rotation is progressively increased. This has an effect of preventing the cassette lid from being closed sharply. While the cassette lid is being closed, the end 31a of the pawl member 31 is moved along the bottom of the groove 29 in forced contact therewith by the biasing force of the spring 32.

When the lid is brought to a position immediately before its closed position, the end 31a of the pawl member 31 strikes the protuberance 29' in the groove 29. With the cassette lid continuously urged in the closing direction, the pawl member clears the protuberance 29' against the biasing force of the spring 32, and its end 31a is brought to the other end 29b of the groove 29. When the end 31a of the pawl member 31 strikes the other end wall 29c of the groove 29, the gear wheel 22 can no longer be rotated. The operator releases the lid upon sensing the striking of the pawl member end 31a against the groove end wall. Consequently, the gear wheel 22 is rotated a slight amount in the reverse direction by the restoring force of the spiral spring 26 until the pawl member end 31a strikes the protuberance 29'. Thus, the cassette lid is locked in the closed position.

To open the cassette lid, the end 31b of the pawl member is disengaged from the protuberance 29' by turning the pawl member against the spring force of the spring 32 either with the finger or via a mechanism which is interlocked with an ejecting button or the like. Thus, the gear wheel 22 is rotated in the reverse direction by the restoring force of the spiral spring 32. The pawl member end 31a is subsequently returned to the groove 29. The reverse rotation also takes place under braking force provided by the damper 9, so that the lid is opened quietly.

It is to be understood that since the end of the protuberance 29' is within the groove 29, the end 31a of the pawl member 31 need not be brought out of the groove 29 when the pawl member end clears the protuberance 29' to go to the other end 29b of the groove 29 immediately before the closing of the lid is completed and also when turning the pawl member 31 against the spring 32 for opening the lid from the closed position. It is thus possible to prevent the otherwise possible detachment of the pawl member end from the groove. In this embodiment, the spring 32 fitted on the pin 30 has one end attached to a step 21b'' of the retainer portion 21b and the other end attached to a folded projection 31' of the pawl member. However, the pawl member 31 may be biased in any suitable manner so long as its end 31a is urged against the bottom of the groove 29 formed on the outer periphery of the gear wheel 22.

In the rotation damper according to the invention, the length of the spiral groove 4 or groove 29 is suitably determined with respect to the amount of rotation of the gear wheel that is necessary for closing the lid from the open position. The rotation of the gear wheel is braked by the damper while the gear wheel is rotated in the opening direction and also in the closing direction. The lid is held locked in the closed position with the spiral spring locked by the locking member after it has been wound up by the rotation of the gear wheel in the closing direction. The lid can be opened by releasing the locked state of the wound-up spiral spring. The rotation damper according to the invention comprises a damper which solely serves to brake rotation, a spring which heretofore would have been provided separately from the damper for biasing the lid to the open position, and a locking mechanism for locking the cassette lid in the closed position, these components being compactly assembled together. The rotation damper thus does not require much space in the associated apparatus, can be easily and readily mounted and can be built into the associated apparatus using a simpler assembly line than heretofore.

What is claimed is:

1. A rotation damper comprising:
a base member;
a gear wheel rotatably mounted on said base member;
damping means affixed to one side of said gear wheel for braking gear wheel rotation in both directions;
a cap member covering said gear member and said damping means secured to said base member;
spring means within said cap member affixed to the other side of said gear wheel on one end and affixed to said cap member at its other end for providing a restoring force in a direction opposite that of desired rotation of said gear wheel; and means for locking said gear wheel in a desired position and preventing said restoring force of said spring means from rotating said gear wheel in a direction opposite that of the desired rotation of said gear wheel and being capable of releasing said gear wheel to allow said restoring force to rotate said gear wheel.

2. The rotation damper of claim 1, wherein said damping means is a sealed viscous damper including a damper disc with oil coated thereon and a seal disc, said damper disc and seal disc being sealed between said base member and said gear wheel.

3. A rotation damper comprising:

a base member;

a gear wheel rotatably mounted on said base member having a spiral groove on one side thereof;

damping means affixed to the other side of said gear wheel for braking gear wheel rotation in both directions;

a cap member covering said gear member and said damping means secured to said base member;

a spring means within said cap member affixed to the spiral groove side of said gear wheel on one end and affixed to said cap member at its other end for providing a restoring force in a direction opposite that of desired rotation of said gear wheel; and means for locking said gear wheel in a desired position and preventing said restoring force of said spring means from rotating said gear wheel in a direction opposite that a desired rotation said means for locking having an end portion which engages and is guided by said spiral groove and having its other end mounted in a spring member secured to said spring means and being capable of releasing said gear wheel to allow said restoring force to rotate said gear wheel.

4. A rotation damper comprising:

a base member;

a gear wheel with a peripheral helical groove rotatably mounted on said base member;

damping means affixed to one side of said gear wheel for braking gear wheel rotation in both directions;

a cap member covering said gear member and said damping means secured to said base member;

a spring means within said cap member affixed to the other side of said gear wheel on one end and affixed to said cap member at its other end for providing a restoring force in a direction opposite that of desired rotation of said gear wheel; and means for locking said gear wheel in a desired position and preventing said restoring force of said spring means from rotating said gear wheel in a direction opposite that of desired rotation, said means for locking being comprised of a pawl member rotatably mounted on said base member and engaged in a guided by said helical groove and being capable of releasing said gear wheel to allow said restoring force to rotate said gear wheel.

* * * * *